March 12, 1957 H. E. BAHR 2,784,772
CLIP FOR SUPPORTING THE END OF A SPRING STRIP
Filed Dec. 11, 1948 2 Sheets-Sheet 1
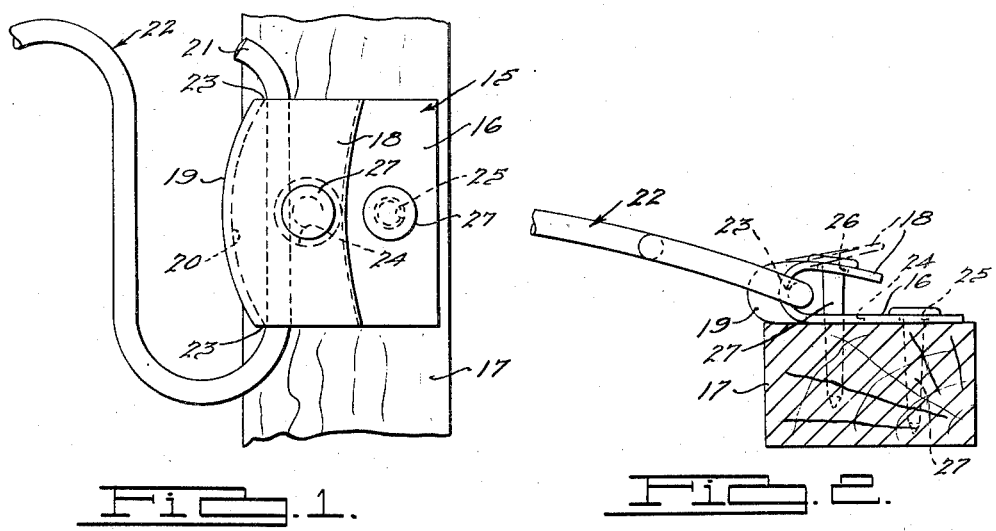
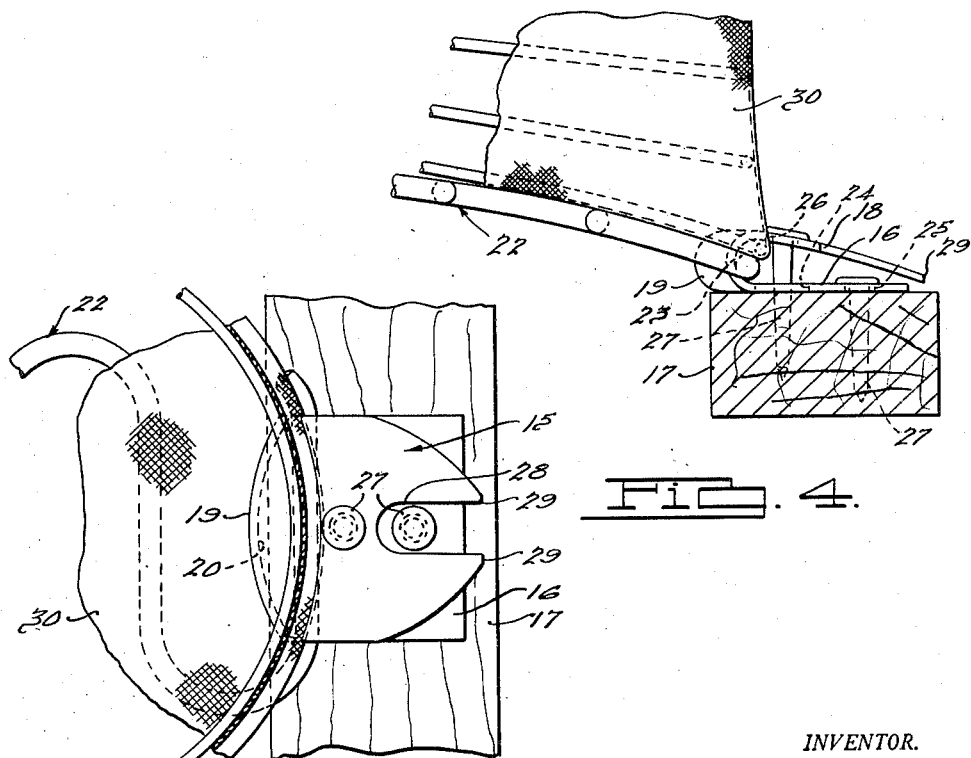
INVENTOR.
Helmut E. Bahr.
BY
Harness, Dickey & Pierce.
ATTORNEYS.

March 12, 1957 H. E. BAHR 2,784,772
CLIP FOR SUPPORTING THE END OF A SPRING STRIP
Filed Dec. 11, 1948 2 Sheets-Sheet 2
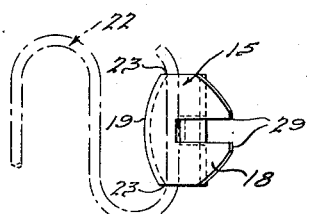
Fig. 5.
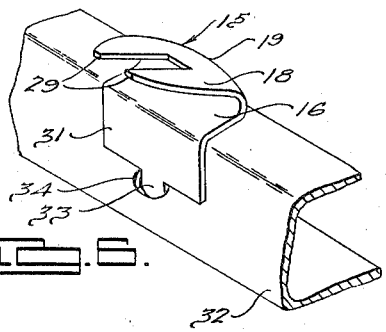
Fig. 6.
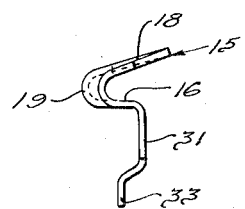
Fig. 7.
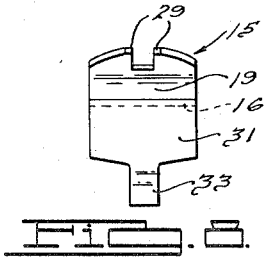
Fig. 8.
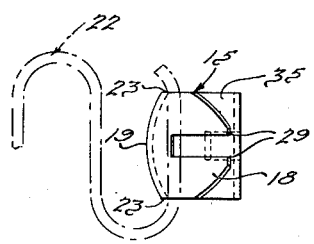
Fig. 9.
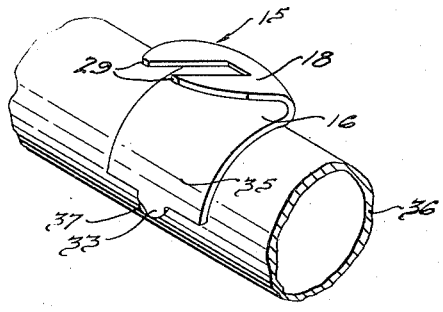
Fig. 10.
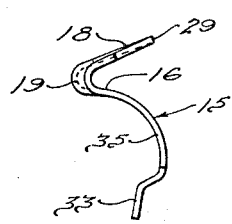
Fig. 11.
Fig. 12.
INVENTOR.
Helmut E. Bahr.
BY
Harness, Dickey & Pierce
ATTORNEYS.

United States Patent Office 2,784,772
Patented Mar. 12, 1957

2,784,772

CLIP FOR SUPPORTING THE END OF A SPRING STRIP

Helmut E. Bahr, East Detroit, Mich., assignor to No-Sag Spring Company, Warren Township, Mich., a corporation of Michigan Application December 11, 1948, Serial No. 64,776

4 Claims. (Cl. 155—179)

This invention relates to spring supporting clips, and particularly to a spring supporting clip formed in a manner to provide spaced engagement for the spring end to prevent the production of sound when the spring is moved.

Difficulty has been experienced heretofore in the art in constructing clips or other supporting elements for ends of springs, particularly sinuous springs, in which the ends are free to pivot. There has been the problem of providing an adequate method of fastening the clip to the frame element and the problem of preventing the noise normally resulting from the movement of the spring relative to the clip. Cloth and similar material has been glued or otherwise secured to the engaging loop of the clip to prevent the production of sound.

The present invention pertains to the construction of a clip or other element having a loop portion in which the end of the spring strip is engaged, with the web portion arched rearwardly of the open loop so that spaced contact occurs between the end of the spring and the ends of the arched web portion. In this manner minimum frictional contact is provided between the spring and the clip. Preferably the clip or other element is made of aluminum, brass or other material with which the end of the spring can move without producing undesirable sounds and squeaks. The loop having the rearwardly arched web portion may be a separate element which may be nailed to the frame or which may be formed to engage flat or round surfaces to which it may be welded, or which may have a lug or finger thereon which permits the clip to be anchored to the surfaces. It is also within the purview of the invention to form the particular clip on an extended web so that the web may be nailed or secured to a member with the clips spaced a predetermined distance apart on the web and the element to which it is secured.

Accordingly, the main objects of the invention are: to provide a clip for supporting the ends of a sinuous spring which prevents sound from being generated when the end of the spring is moved relative to the clip; to provide a clip having a loop or U-shaped spring engaging portion, the web of which is arched outwardly from the open ends so as to provide spaced engaging portions for the end of the spring to engage; to provide a clip having a U-shaped spring and receiving portion which is slotted at the top to provide sharp end portions and which is formed on the bottom to engage a frame in a manner to be secured thereto; and, in general, to provide a spring clip of a form to be attached to a frame for supporting the ends of spring strips in a manner to prevent sounds from being generated when the end is moved relative thereto.

Other objects and features of novelty of the invention will be specifically pointed out or will become apparent when referring, for a better understanding of the invention, to the following description taken in conjunction with the accompanying drawings, wherein:

Figure 1 is a plan view of a clip for supporting one end of a sinuous spring, with the clip attached to a frame;

Fig. 2 is an end view of the structure illustrated in Fig. 1;

Fig. 3 is a view of structure, similar to that illustrated in Fig. 1, showing a further form of the invention;

Fig. 4 is an end view of the structure illustrated in Fig. 3, and

Figs. 5 to 12 are additional views of the clip illustrated in Fig. 1, showing further modified forms thereof.

Referring to Figs. 1 to 4 inclusive, a clip 15 is illustrated in the form of a U-shaped loop having an attached web 16 by which the clip is supported to the frame element 17. For convenience of reference, the web 16 will hereinafter be referred to as the bottom web of the loop. A web 18 is provided above the web 16 being joined thereto by an arcuate web portion 19. Similarly, for convenience of reference, the web 18 will hereinafter be referred to as the top web of the loop. It will be noted that the web portion 19 is arched outwardly of the webs 16 and 18; that is, the crest of the arch is in a direction opposite the open end of the loop so that the end 21 of the sinuous spring 22 does not contact the main body of the inside surface 20 of the loop but does contact the web portion 19 at the edges 23. In this manner there is provided a very limited area of engagement between the ends of the web 19 and the spring. It has been found that this small area of engagement forms a smooth bearing surface which, when brass, aluminum, bronze and like materials are utilized for the construction of the web, entirely eliminates any sound through the rotation of the end relative to the bearing areas. The bottom web 16 is provided with apertures 24 and 25 and top web 18 is provided with an aperture 26, the latter being in alignment with the aperture 24 in the web 16 in a manner such that nails or screws 27 may be passed through the apertures into the frame 17.

In Fig. 2 the top web 18 is shown in alternate positions, the broken line indicating its position at the time the clip is set in place and the solid line indicating its position when it has been secured to the frame by a nail or screw. As shown, the top web 18 may be forced downwardly in order to decrease the width of the loop between the two webs 16 and 18. As shown in Fig. 4, the top web 18 is sufficiently long to cover the web 16 when the clip has been securely fastened.

In Fig. 3, the top web 18 of the clip 15 is provided with an indented or slotted portion 28 with points 29 on each side of said slotted portion. A fabric 30, such as burlap, serves as a cover for the springs 22 and is fastened or pinned by engaging a portion of the fabric 30 in the loop between the bottom web 16 and the top web 18 after having forced the clip points 29 through the fabric.

In Figs. 5 to 8 inclusive, there is shown a modification of the spring clip of the invention which is adapted primarily to fit rectangularly shaped frame members. Similarly, in Figs. 9 to 12 inclusive, there is shown a modification adapted primarily to fit tubular members. In addition, the Figs. 5 to 12 inclusive, show a new and improved method for securing the clips to the frame member. As in the preceding figures, the clip 15 is provided with the bottom web 16, the top web 18, the backwardly arched web portion 19, and the clip points 29. As in the preceding figures, the spring 22 engages the clip at the edges 23 to provide a small bearing surface.

Referring particularly to Fig. 6, a flanged web 31 extends downwardly from the bottom web 16 in a manner providing for an intimate fit against the rectangularly shaped frame member 32. A lug 33 is an extended portion of the flanged web 31 and fits into a hole 34 in the frame 32 and engages said frame in a manner to prevent any force applied against the inside surface of the loop portion of the clip from dislodging the clip.

Referring particularly to Fig. 10, an arcuate web 35 extends downwardly from the bottom web 16 in a manner providing for an intimate fit against a tubular frame member 36. Similarly a lug 33 is an extension of the arcuate web 35 and is adapted to fit into a hole 37 in the frame 36 and engage said frame in a manner to prevent any force directed against the inside surface of the loop portion of the clip from dislodging said clip.

It will be apparent that the clip of the invention, as well as the lug 33, may be formed to engage any shape frame and that in addition to fastening the clip by means of said lug, the clip may be nailed, bolted, welded, or otherwise joined to the frame. Although I do not wish to limit my invention to any particularly shaped lug, I prefer to determine the shape of the lug 33 and the shape of the slotted portion 28 in a manner such that the forming of the lug on one clip provides the slotted portion of the succeeding clip in successive stamping operations.

Further, it is within the purview of the invention that a number of clips may contain some structural parts in common. For example, a multiple clip may consist of a common bottom web portion, equivalent to web 16 in the drawings, and having a plurality of extending top web portions at a predetermined spacing and equivalent to web 18 in the drawings.

What is claimed is:

1. In a clip for securing a spring to a frame element; a loop portion comprising upper and lower flanges joined by an arched web portion at the closed end of the loop portion, the crest of the arch being in a direction opposite the open end of the loop portion and a pointed end on the upper flange disposed above the lower flange.

2. In a clip for securing a spring to a frame element; a loop portion to engage the spring; an arched web portion at the closed end of the loop, the crest of the arch being in a direction opposite the open end of the loop; and a top web portion as a part of the loop, said top web portion being provided with a slotted portion extending inwardly from the edge of said top web portion in a manner to provide points on said top web, the points being in the direction of the open end of the loop.

3. A clip for securing a spring to a frame element, said clip being of U-shape having spaced substantially parallel top and bottom flanges joined by a curved web portion which is arched laterally across the width of the clip, with the crest of the arch disposed to the open end of the clip, said bottom flange having means by which the clip is supported on a frame element, the top flange having the sides converging to a central slot which extends inwardly thereof to produce spaced points on the forward end of the top flange.

4. A clip for securing a spring to a frame element, said clip being of U-shape having top and bottom flanges joined by a web portion which engages and secures an end of the spring to the frame, said top flange having an elongated aperture extending inwardly from the end opposite to the web portion and having the side edges converging toward said end and aperture to form spaced points for piercing fabric material employed with the springs, said bottom flange having means by which the clip is secured to a frame.

References Cited in the file of this patent

UNITED STATES PATENTS

| | | |
|---|---|---|
| 200,213 | Merrill | Feb. 12, 1878 |
| 293,009 | Griffith | Feb. 9, 1884 |
| 942,366 | Deeter | Dec. 7, 1909 |
| 1,134,132 | Hotchkin | Apr. 6, 1915 |
| 1,281,440 | Vinette | Oct. 15, 1918 |
| 1,797,787 | Owen | Mar. 24, 1931 |
| 1,834,789 | Lodge | Dec. 1, 1931 |
| 2,096,822 | Oldham | Oct. 26, 1937 |
| 2,166,989 | Gleason | July 25, 1939 |
| 2,215,373 | Krakauer | Sept. 17, 1940 |
| 2,243,127 | Roseman | May 27, 1941 |
| 2,266,896 | Nordmark | Dec. 23, 1941 |
| 2,427,770 | Ellinwood | Sept. 23, 1947 |